C. T. TORSELL.
MUFFLE FURNACE.
APPLICATION FILED JUNE 4, 1914.

1,295,637.

Patented Feb. 25, 1919.
2 SHEETS—SHEET 1.

WITNESSES.
J. R. Keller
John F. Hill

INVENTOR.
Carl T. Torsell
By Kerr Page Cooper Hayward
Attys

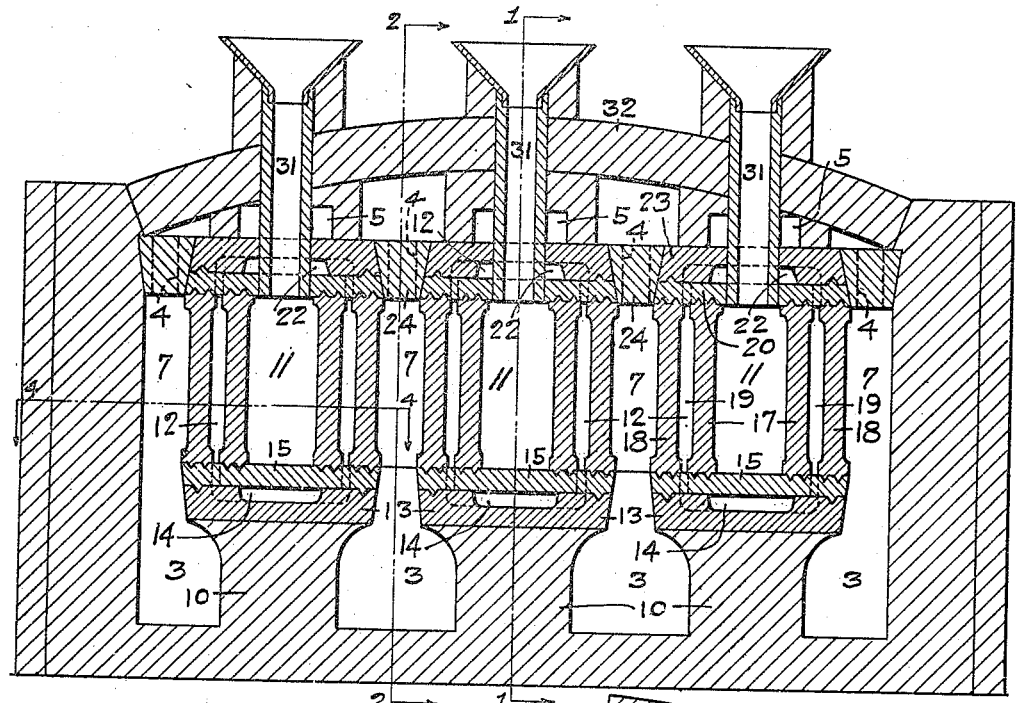
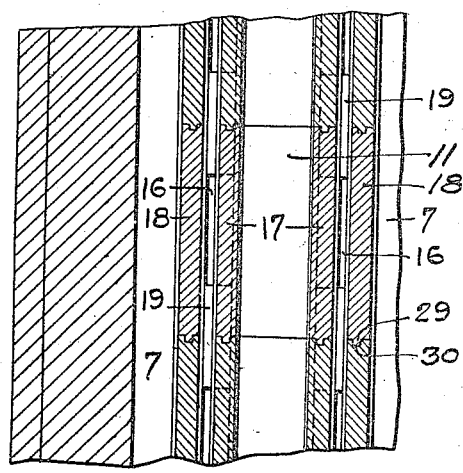
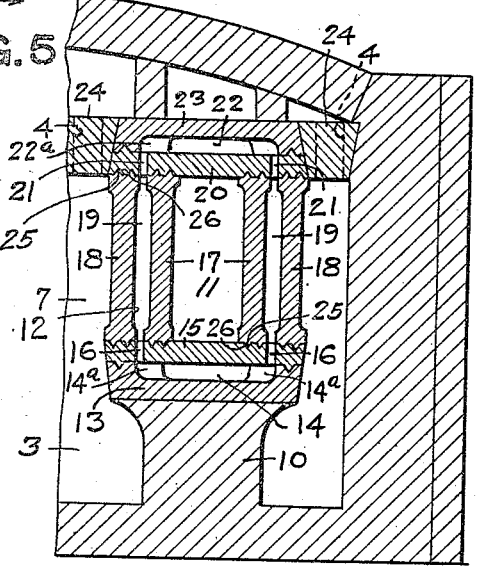

UNITED STATES PATENT OFFICE.

CARL T. TORSELL, OF WARREN, OHIO.

MUFFLE-FURNACE.

1,295,637.　　　　Specification of Letters Patent.　　Patented Feb. 25, 1919.

Application filed June 4, 1914.　Serial No. 843,015.

*To all whom it may concern:*

Be it known that I, CARL T. TORSELL, a citizen of the United States, and resident of Warren, in the county of Trumbull and State of Ohio, have invented a new and useful Improvement in Muffle-Furnaces; and I do hereby declare the following to be a full, clear, and exact description thereof.

My invention relates to muffle furnaces for treating metals, such as by carbureting or case hardening steel or iron bars and plates. The ordinary furnaces employed for this purpose have the heat or flame in direct contact with the walls inclosing the material within the muffle which is built within or movable within the heating chamber and it is found that because of the difference in the application of heat to the material inclosed within the muffle chamber, such as the plates or bars of steel or iron separated by suitable carbureting material such as charcoal or coke or mixtures thereof, different parts of the material are carbureted to different depths according to the heat developed in the particular parts of the muffle chamber which is being heated higher than other portions thereof. The object of my invention is to provide for the even distribution of the heat around the muffle chamber and in that way to obtain a substantially even distribution of heat within the chamber, and a more even heating and carbureting or case hardening of the materials.

The invention consists generally stated in a muffle furnace having inclosing walls forming the muffle chamber adapted to contain the material to be treated, and around such muffle chamber inclosing walls forming a closed space for air or other suitable fluid for the circulation and distribution of the heat of the furnace to the muffle chamber. It also consists in other improvements, as hereafter described.

Figure 1:
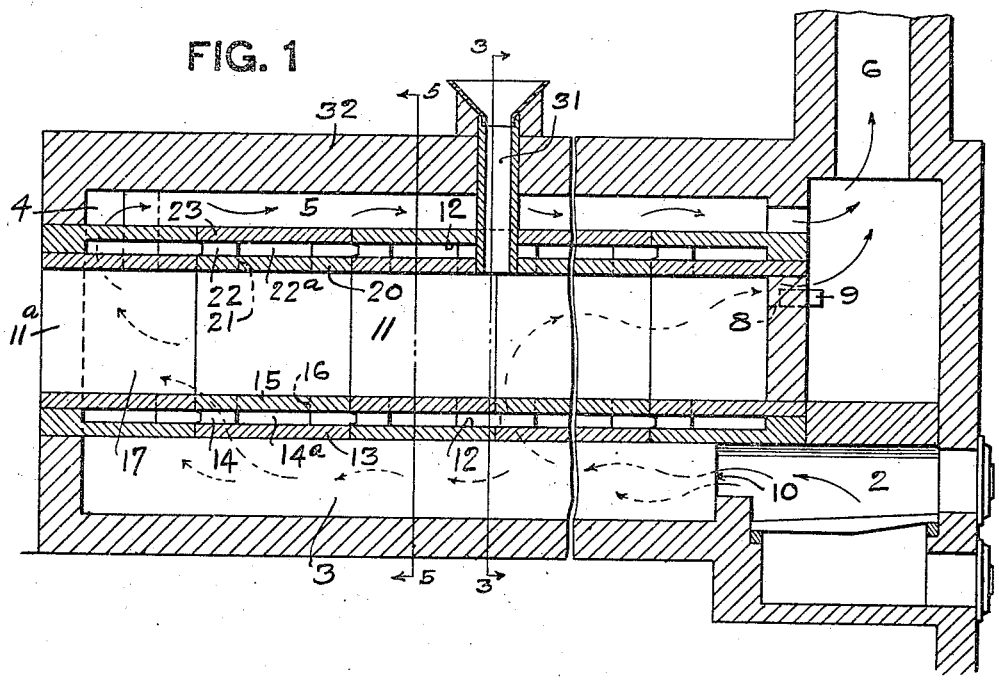
Figure 2:
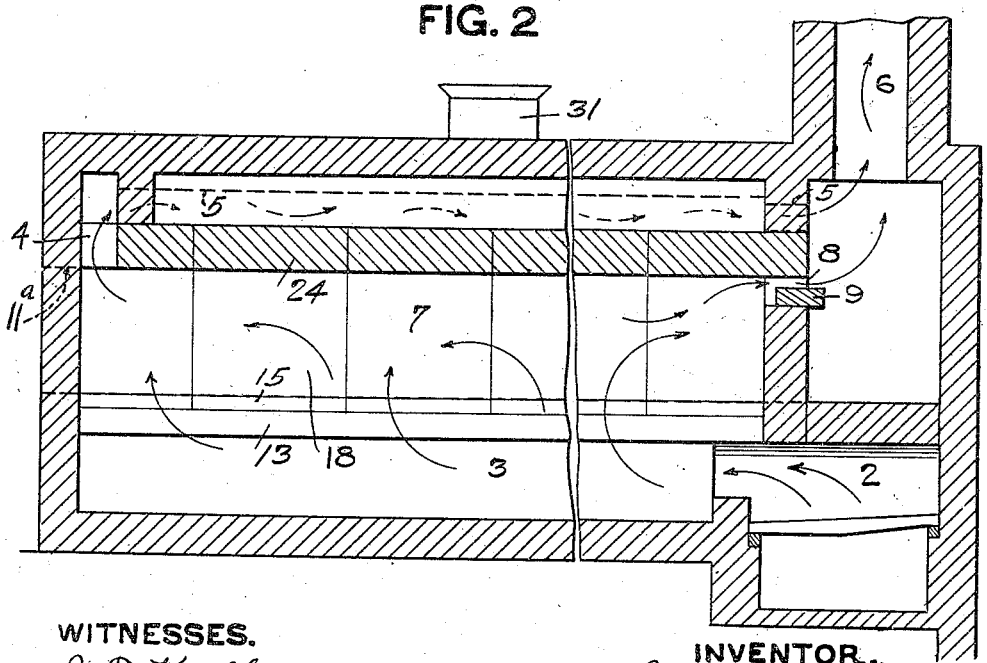

In the accompanying drawings, Figure 1 is a longitudinal section of a muffle furnace embodying the invention, the section being formed on line 1—1, Fig. 3. Fig. 2 is a like view, the section being formed on the line 2—2, Fig. 3. Fig. 3 is a cross section of the furnace on the line 3—3, Fig. 1; Fig. 4 is a horizontal section of a portion of furnace showing the spread walls forming the muffle and surrounding chamber; and Fig. 5 is a cross section of one of the muffles showing more clearly the continuous inclosing air space around the muffle.

The invention may be employed with any suitable furnace for using gaseous liquid or solid fuel, the furnace illustrated being a coal fired furnace having the fire chamber 2 extending back from which are the flues 3 which lead upwardly at the rear of the furnace, as at 4, and connect by means of the upper horizontal flues 5 with the stack 6, there being also the longitudinal chambers 7 rising from the flues 3 and communicating at one end with the flue 4 by the ports 8 communicating with the stack 6, said ports being partially closed by suitable bricks 9, as desired, to regulate the heat so that part of it passes through the furnace above the port, through said port 8 into the stack. Within this heating chamber is built the muffle chamber around which heat is caused to circulate in any desired way, the furnace illustrated simply representing one good way of applying the heat in a coal fired furnace. In the construction illustrated the piers 10 separate the lower horizontal flues 3, said piers extending for the length of the furnace, and supporting the muffles 11 separated by the longitudinal flues 7 above referred to. This muffle chamber 11 is made of any desired length and is arranged to be closed during the cementation or carbureting action as by the bricking up of the port 11$^a$ at the opposite end of the furnace from the stack 6. For the building of the muffle any suitable material may be employed. I prefer, however, to employ a series of tiles which will provide the muffle chamber to receive the bars and plates or other material to be treated and around the same the inclosing air space 12, this being accomplished by the tiles, as illustrated in the drawing; for example the tiles 13 rest upon the piers 10, such tile having the recesses 14 forming the lower portion of the air spaces and having side recesses 14$^a$, while the tiles 15 rest upon the tiles 13 and inclose the longitudinal recesses 14 extending under the muffle chamber for its full length and provide the vertical ports 16 leading upwardly through the tiles, as shown in the several figures. Resting on the tiles 15 are the tiles 17 forming side walls of the muffle chamber, and outside of said tiles and inclosing the same are the tiles 18 which with the tiles 17 form the vertical air channels 19 leading up to the top or cover tiles 20. These top or cover tiles have the ports 21 extending through them and communicating with the side recesses 22$^a$ leading to the longitudinal recesses 22 in the upper roof tiles 23, which extend over the top of the muffle chamber. Thus I am enabled to provide around the muffle chambers 11, the continuous inclosing air space 12 within which the inclosing air can circulate and distribute its heat through the walls of the muffle chamber to the material therein. The space 12 has no communication with the atmosphere and is purely of an insulating character. The several tiles thus referred to are made in suitable sections and are preferably fitted together by tongue and groove connections, so that when the muffles are built up a continuous surrounding and inclosed air space is provided for the length of each muffle. The cover tiles 20 and 23 are illustrated as joined by wedge tiles 24, which form the roof portions of the longitudinal flues 7 and through the same are formed the ports 4 leading to the top flue spaces around the muffles. Thus the tiles 17 and 18 have suitable tongues 25 seated in grooves 26 on the top floor tiles 15 by which these longitudinal tiles 17 and 18 are easily held to proper distance to form the longitudinal air space 12 and they have like tongues engaging with the roofs in the lower cover tile 20. The several sections of tiles are also preferably connected by tongue and groove joints along their edges such as the tongue and groove joints 29 and 30, as shown in Fig. 4.

The drawings also show the vertical feeding spouts 31 extending down through the main roof 32 by which the ground mixture of charcoal, coke or other carbureting material can be fed in filling the muffle with plates or bars or other articles to be treated.

In the use of the invention the muffle chambers are charged in any suitable way in separate plates or bars or in packages through ports such as the ports 11ª, shown in Fig. 1, layers of carbureting material being filled in between them, such as through the charging spouts 31, the plates to be charged resting on the same, and further layers of charcoal or other carbureting material being spread upon the plates when another layer of plates are put in place, the muffle being thus filled up to its top cover. If other shapes of metal to be case hardened, cemented or carburized are used, the carbureting material is suitably distributed over and around the surfaces thereof as needed. The charging openings are then built up with brick work and steel, as are also the charging funnels extending through the roofs of the muffle chambers. A continuous heat is applied to the muffles for a sufficient period, such as from sixteen to thirty hours according to the carburization or cementation desired. Part of the heat is circulated from the furnace chamber 2 through the lower longitudinal flues 3, and then up around the upper longitudinal flues 7 between the different muffle chambers passing through the ports 4 to the upper horizontal flues 5 and thence to the stack or wall port, passing through the stack 6, and part through the ports 8 and thence to the stack the distribution of the heated products being according to the desired heating of the furnaces, which can be watched by suitable ports or peep holes. The heat applied passes through the outer inclosing tiles, such as through the walls 13, 18 and 23 and heats the air within the continuous inclosed air space 12, the air therein circulating according to the heat developed, and then penetrating through the inner walls forming the muffle chamber itself, for example through the tiles 15, 17 and 20. Thus an even distribution of heat is obtained within the muffle chamber through the circulation of the heat within the inclosed air space instead of the muffle chamber walls by direct contact with the flame and heated products of combustion with the muffle chamber. As the heat passes through the outer walls, it is radiated in all directions spreading within the inclosing air space, and there is opportunity for such distribution of the heat therein through the circulation of the air within the chamber, a practically even distribution of the heat through the inclosing walls of the muffle chamber, and a practically even heating of the contents therein, causing a much more even and uniform cementing or carburizing of the material within the muffle chamber, and thus insuring practically uniform carburization to the different plates or other metal bodies subjected to the treatment.

In this operation where one part of the outer inclosing walls of the muffle might be subjected to higher heat, this will not injuriously affect the heating of the materials within the muffle because the heat passing through the outer tiles or walls separates within the inclosing chamber 12, and there is such circulation therein as causes practically even passing of heat through the inner walls or tiles forming the muffle chamber proper. There is also a longitudinal circulation of the inclosed air through the continuous slots or ports forming the continuous air space around the muffle chamber proper. I am enabled thus to produce more uniformly treated plates and overcome the difficulties heretofore encountered with furnaces where there was over carburization of some parts of the charge and under-carburization in others.

What I claim is:

1. A muffle furnace having a pier extending longitudinally therethrough, and having a muffle chamber formed of tile, the bottom of said chamber being formed of two parallel tiles having recesses therein forming together a longitudinal air space below the chamber, the side walls being formed of two parallel tiles in connection with the air space in the bottom wall of the chamber and the top wall of the chamber being formed of two parallel tiles having recesses therein forming an air chamber above the muffle chamber, said several spaces being connected to form a closed insulating fluid space around the muffle chamber for distributing the heat of the furnace within said muffle chamber.

2. A muffle furnace having a pier extending longitudinally therethrough, and having a muffle chamber formed of tiles or brick, the bottom of said chamber being formed of two parallel tiles having recesses therein forming together a longitudinal air space below the chamber, the said walls being formed of two parallel tiles forming air spaces and the top wall of the chamber being formed of two parallel tiles having recesses therein forming an air chamber above the muffle chamber, said several spaces being connected to form a closed insulating fluid space around the muffle chamber for distributing the heat of the furnace within said muffle chamber, said several tiles having tongue and groove connections to hold them in place.

3. A muffle furnace having heating chamber, and a series of piers extending therein and a series of muffle chambers supported on said piers each of said muffle chambers being formed of tiles which provide closed insulating fluid spaces around each muffle chamber, and the top or cover tile being connected by wedge tiles to form the roof of the heating chamber of the furnace.

In testimony whereof, I the said CARL T. TORSELL, have hereunto set my hand.

CARL T. TORSELL.

Witnesses:
 JOHN F. WILL,
 J. R. KELLER.

Copies of this patent may be obtained for five cents each, by addressing the "Commissioner of Patents, Washington, D. C."